April 28, 1942.                D. E. AUSTIN                 2,280,882
                              ADJUSTABLE SEAT
                            Filed May 21, 1940            2 Sheets-Sheet 1

Inventor
Dwight E. Austin
By Blackmore, Spencer & Flint
Attorneys

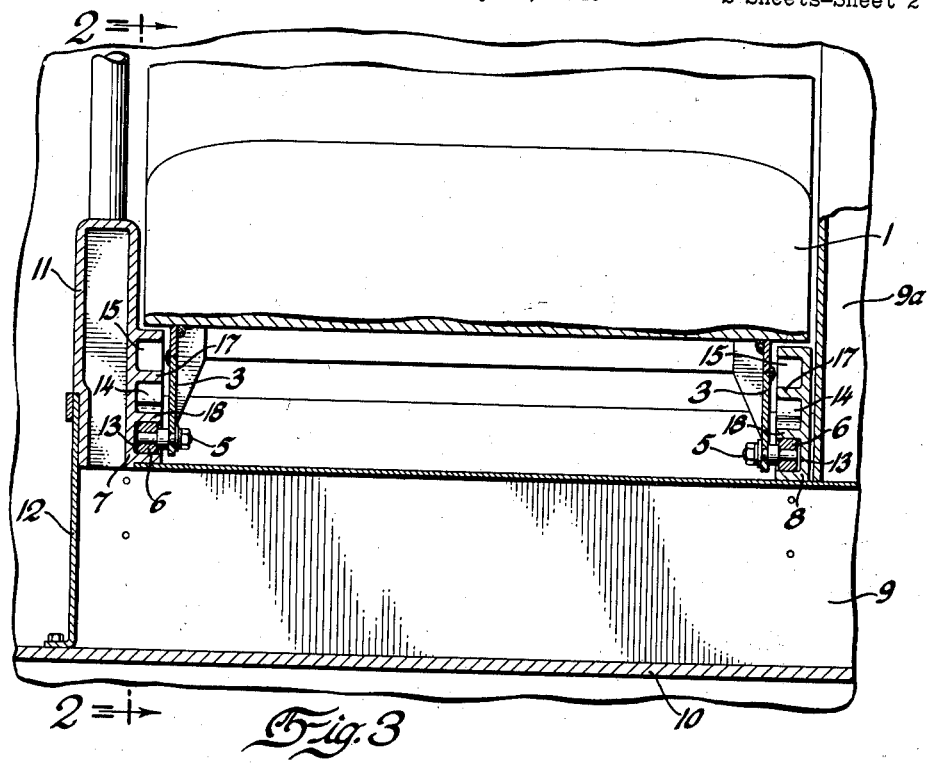

Patented Apr. 28, 1942

2,280,882

UNITED STATES PATENT OFFICE 2,280,882

ADJUSTABLE SEAT

Dwight E. Austin, Pontiac, Mich., assignor to Yellow Truck & Coach Manufacturing Company, Pontiac, Mich., a corporation of Maine Application May 21, 1940, Serial No. 336,474

3 Claims. (Cl. 155—14)

To promote operator alertness and safer travel of motor busses and other conveyances it is important that the driver be able to handle his controls in comfort and within easy reach. Since the controls at the driver's station are in fixed location the driver may be fitted to them by proper positioning of his seat to suit convenience and it is an object of the present invention to provide an improved seat structure having a wide range of adjustment relative to the controls, both to accommodate drivers of different size and to enable a driver to vary seat positions for the relief of fatigue.

A further object of the invention is to enable the seat to be positioned at selected distances from the controls in each of several heights and to be shifted readily between and retained securely in any of the large number of vertical and longitudinal combinations afforded.

Another object is to provide a more compact and simplified seat mounting which can be manufactured and installed at low cost and which permits the under seat space to be employed usefully for any desired purpose, as for example the location of an air ventilating duct, a storage locker or the like.

Figure 1:
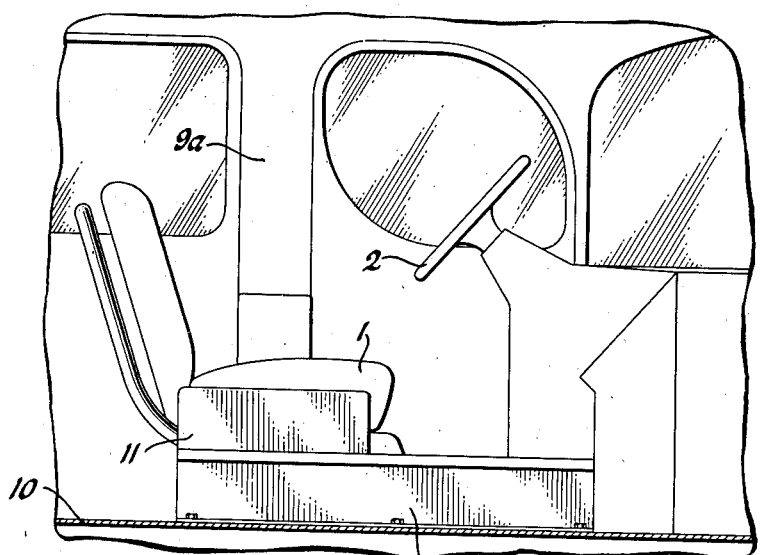
Figure 2:
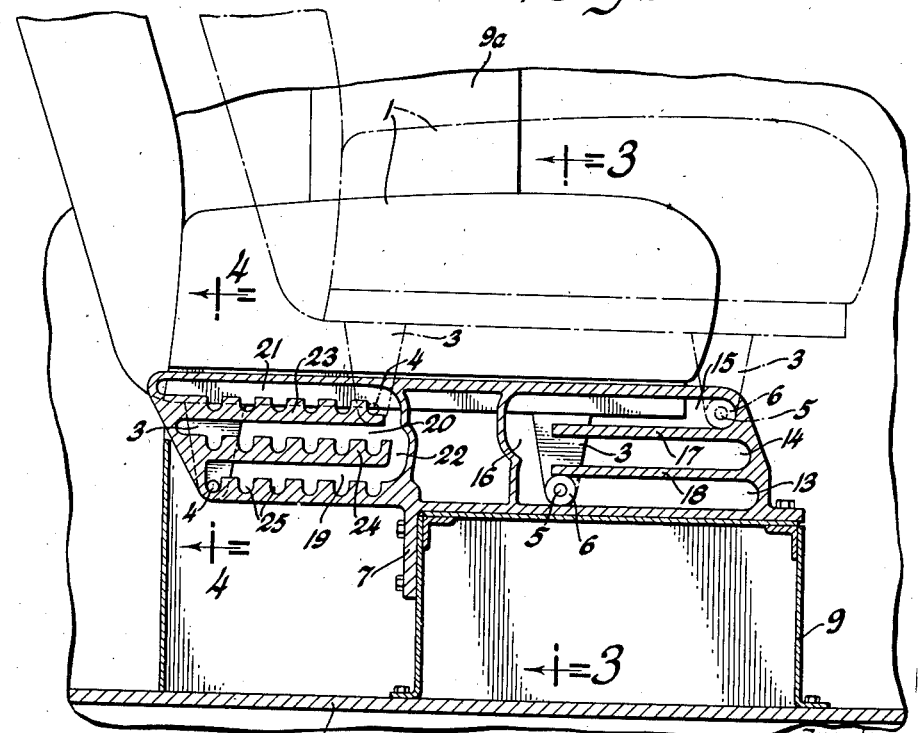

Additional objects and advantages will become apparent during the course of the following specification having reference to the accompanying drawings wherein Figure 1 is a side elevation of the driver control station on the inside of a motor coach; Figure 2 is an enlarged view of the seat mounting with parts in section as on line 2—2 of Figure 3, and Figures 3 and 4 are transverse sectional views taken on lines 3—3 and 4—4, respectively, of Figure 2.

The seat assembly including a back rest is indicated at 1 directly behind the steering wheel 2 at the front of the vehicle. For the sake of simplicity the usual foot pedals, hand levers, door operating mechanism and instrument panel mounted controls are omitted from the drawings. The frame of the seat assembly carries a series of dependent legs 3, one adjacent each corner with lateral feet or projections at their lower ends. Those projections carried by the rearmost set of legs 3 include pins 4 arranged in axial alignment and the lateral projections carried by the forward set of legs 3 include similar transversely aligned pins 5, each of the latter mounting a roller 6. The longitudinally spaced projections 4 and 5 on the two sides extend into recessed pockets on the inside faces of inner and outer mounting brackets 7 and 8 of cast metal, which are secured on top a hollow box or base member 9 fastened to the floor 10 of the vehicle. In case the coach is to be air conditioned, convenient use may be made of the hollow box 9 as an air delivery duct communicating with an under floor air conditioning system and leading laterally to a side wall riser 9a through which air is supplied to a distribution duct in the coach roof. For appearance purposes the inner bracket 7 includes a portion 11 extending upwardly beside the seat 1, and between the bracket 7 and the floor 10 a vertical plate 12 runs from the rear of the bracket forwardly to the vehicle dash affording a low dividing wall between the driver foot space and the loading platform.

Each of the recessed inner faces of the mounting brackets 7 and 8 is formed as shown in the sectional view, Figure 2, wherein the two pockets for receiving the spaced projections 4 and 5 are arranged in tandem and each includes a series of superposed longitudinally extending grooves or guideways. The guideways associated with the foremost projection 5 with its roller 6, are indicated by the numerals 13, 14 and 15, all communicating with one another at the rear through a transfer passage 16. Separating the guideways from one another are the intervening horizontal shelves or ribs 17 and 18 which together with the bottom wall of the pocket afford a series of vertically spaced rails on which the supporting roller 6 may ride upon its introduction into a selected guideway. Similarly the rearmost pin 4 may be located in any one of a number of superposed guideways 19, 20 and 21 communicating at their forward ends through a transfer passage 22 and being separated from one another by the ribs or rails 23 and 24. In this instance each of the rails 23 and 24 as well as the lower wall of the guide 19 is toothed to provide a series of longitudinally spaced locating notches 25 to receive the pin 4 and thereby retain the seat assembly 1 in selected positions of adjustment. Two positions of the seat assembly are indicated in Figure 2, the full line position indicating the lower and rearmost position of adjustment and the broken line position indicating its upper and foremost position of adjustment.

For changing fore and aft position of the seat, the pin 4 on each side is lifted from its retaining notch 25 by tilting the seat back forwardly and shifting the seat assembly longitudinally, with the rollers 6—6 riding on their respective rails. If a change in vertical position is desired the seat is shoved to its forward limit to enable the pins 4 to be moved through their respective transfer passages 22 to enter the desired guideway 19, 20 or 21. Then the seat is pushed to its rearmost limit which brings the roller 6 at each side, into the vertical passage 16 for transfer into one of the guideways 13, 14 or 15 aligned with the previously selected guideway containing the pin 4 of the rearmost set. Thereafter the seat assembly can be moved to desired fore and aft location and the pins 4 deposited in the proper retaining notches 25 provided therefor. It will be understood that if the forward set of projections or rollers 6—6 are placed in guideways which are out of alignment with the guideways receiving the rearmost set of projections or pins 4—4, the seat assembly 1 will be tilted forward or backward as the case may be, at any selected height and distance from the controls within the limits of pin and groove engagement. Thus the inclined seat relations possible greatly increases the extent of adjustment through combinations of the vertical and the longitudinal ranges of movement.

From the above it will be seen that a seat mounting is provided which is characterized by the absence of complicated and expensive parts and yet enables the seat to be raised or lowered and shifted fore or aft at the selected height. Adjustments are easily and quickly accomplished without clamps or locks and with the locating pins set firmly in their retaining notches of the toothed supporting rail, the natural downward and rearward pressure on the seat maintains it against accidental displacement.

I claim:

1. An adjustable seat having forward and rearward sets of spaced transversely extending projections, mounting brackets therefor including a set of transversely spaced brackets each having a series of vertically superposed longitudinal slots open to one another at one end and affording guideways for the selective reception of an adjacent projection and a second set of projection receiving brackets arranged in tandem relation to the first mentioned set and provided with vertically spaced longitudinally extending guideways, each of the last mentioned ways having a series of longitudinally spaced notches for the selective reception and location of an adjacent projection therein.

2. In a chair assembly adjustable to several longitudinal settings in each of several vertical heights, cooperating seat and base members, one thereof having four bearing feet fixedly mounted thereon, one at each corner of the assembly, bearing devices carried by the other member and complemental to said feet, each bearing device complemental to each foot comprising a set of vertically spaced and longitudinally extending horizontal guideways for selectively receiving said foot and accommodating its relative longitudinal adjustment through a range of selective longitudinal settings coincident with adjustment of all the feet in their respective guideways, the horizontal guideways of at least one set having longitudinally spaced foot receiving and locating notches for retaining the seat and base members against accidental displacement from their relative longitudinal setting, and a vertical transfer passage for each set of guideways for the vertical adjustment of the complementary foot from one guideway to another.

3. A mounting bracket to receive a pair of shiftable seat supporting pins, comprising a hollow casing having top, bottom and opposite end walls and being open on one side for projection thereinto of said pins, a pin supporting horizontal web partition projecting rearwardly from the front end wall of the casing in substantially parallel spaced relation to the casing top and bottom walls to partition the casing space above and below the same into superposed guideways selectable by one of said pins for reception and longitudinal adjustment therein and terminating at a vertical pin transfer chamber open to said guideways, a second pin supporting horizontal web partition projecting forwardly from the rear end wall in substantially parallel spaced relation to the casing top and bottom walls dividing the casing rearward space into superposed guideways selectively engageable by the other pin and terminating in longitudinally spaced relation to the first mentioned web partition, said guideways communicating with each other for pin transfer ahead of the forward terminal of the web partition.

DWIGHT E. AUSTIN.